(12) United States Patent
Ando

(10) Patent No.: US 7,941,474 B2
(45) Date of Patent: May 10, 2011

(54) ARITHMETIC CIRCUIT, ARITHMETIC METHOD, AND INFORMATION PROCESSING DEVICE

(75) Inventor: Hisashige Ando, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 893 days.

(21) Appl. No.: 11/864,084

(22) Filed: Sep. 28, 2007

(65) Prior Publication Data
US 2008/0155004 A1 Jun. 26, 2008

(30) Foreign Application Priority Data

Dec. 25, 2006 (JP) ................................. 2006-346997

(51) Int. Cl.
*G06F 11/16* (2006.01)
(52) U.S. Cl. ........................................................ 708/534
(58) Field of Classification Search ................. None
See application file for complete search history.

(56) References Cited

U.S. PATENT DOCUMENTS

| | | | | |
|---|---|---|---|---|
| 3,660,646 A | * | 5/1972 | Minero et al. ................ 708/533 |
| 4,924,467 A | * | 5/1990 | Criswell ........................ 714/820 |
| 5,018,093 A | * | 5/1991 | Shih .............................. 708/533 |
| 5,428,768 A | * | 6/1995 | Sugahara ........................ 714/10 |
| 5,506,800 A | * | 4/1996 | Dao-Trong .................... 708/531 |
| 5,805,797 A | * | 9/1998 | Sato et al. ....................... 714/48 |
| 6,330,701 B1 | * | 12/2001 | Rosendahl et al. ........... 714/757 |
| 6,519,730 B1 | | 2/2003 | Ando et al. |
| 7,035,891 B2 | * | 4/2006 | Makineni et al. ............. 708/530 |
| 2010/0241939 A1 | * | 9/2010 | Rozen-Atzmon ............. 715/202 |

FOREIGN PATENT DOCUMENTS

JP 6-83591 3/1994

OTHER PUBLICATIONS

H. Ando et al.; "A 1.3-GHz Fifth-Generation SPARC64 Microprocessor"; IEEE Journal of Solid-State Circuits, vol. 38, No. 11, Nov. 2003; pp. 1896-1905.

* cited by examiner

*Primary Examiner* — David H Malzahn
(74) *Attorney, Agent, or Firm* — Staas & Halsey LLP

(57) ABSTRACT

To provide a floating point arithmetic circuit for efficiently defecting an error, which has a large numerical error, with a less circuit amount, the floating point arithmetic circuit comprises a first arithmetic unit for outputting a first arithmetic result, a second arithmetic unit for outputting a second arithmetic result, and a comparison circuit for making a comparison between the first and the second arithmetic results by a predetermined bit width.

20 Claims, 10 Drawing Sheets

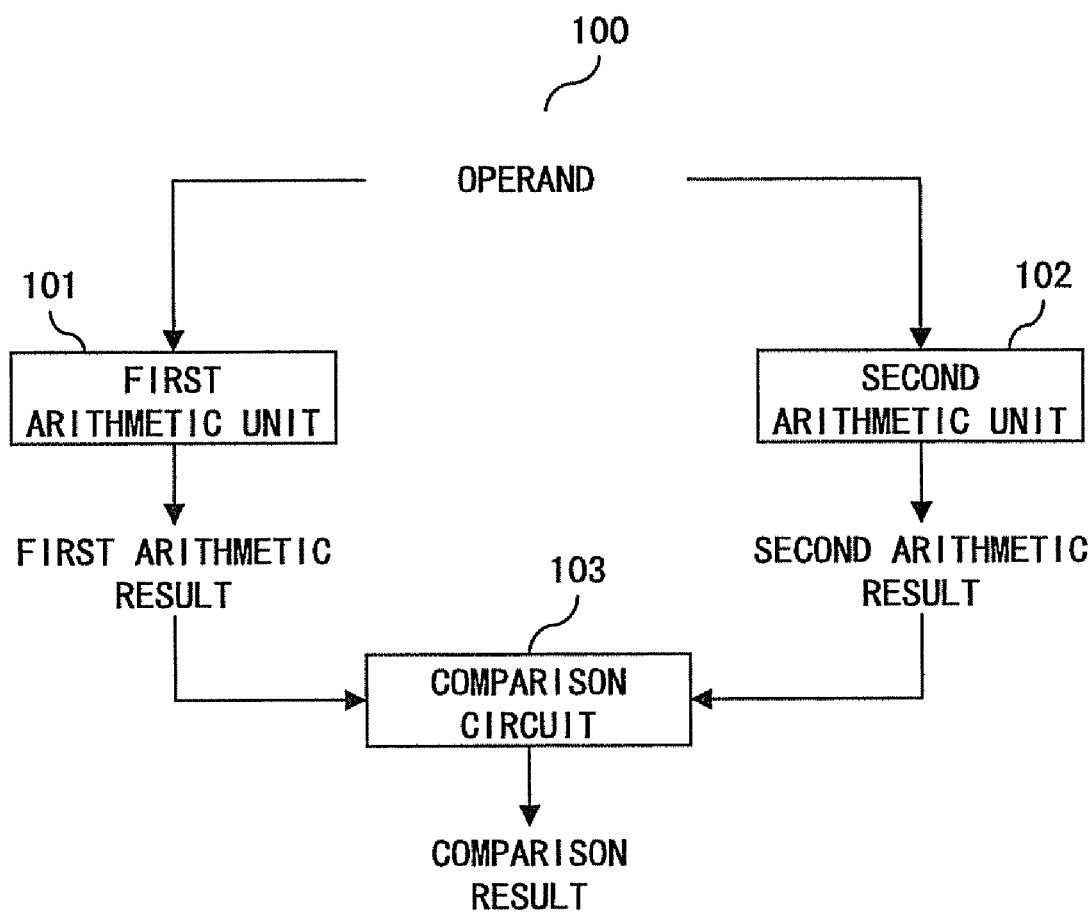
F I G. 1

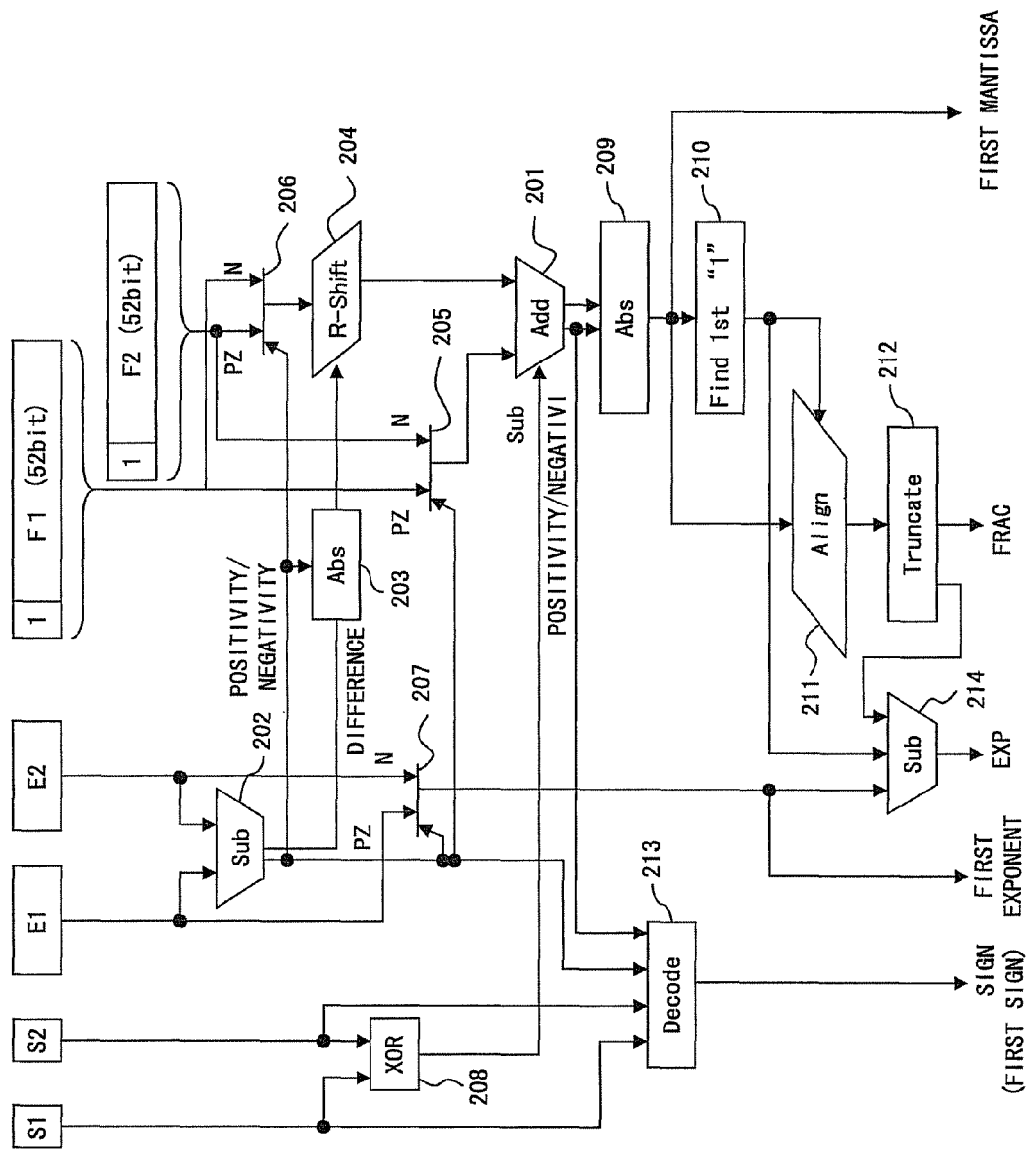
F I G. 2

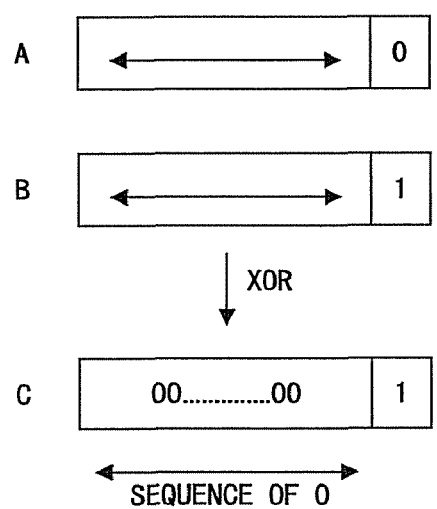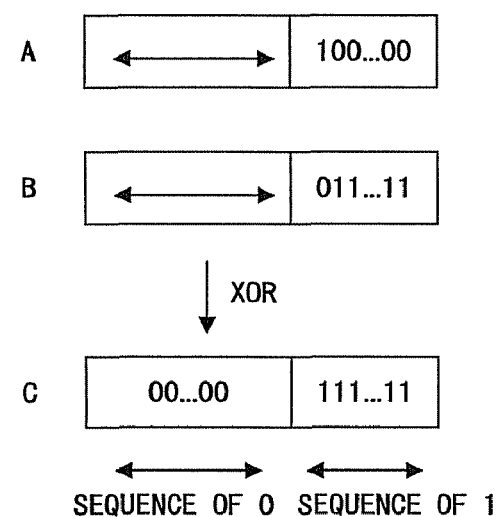
F I G. 4 A  F I G. 4 B

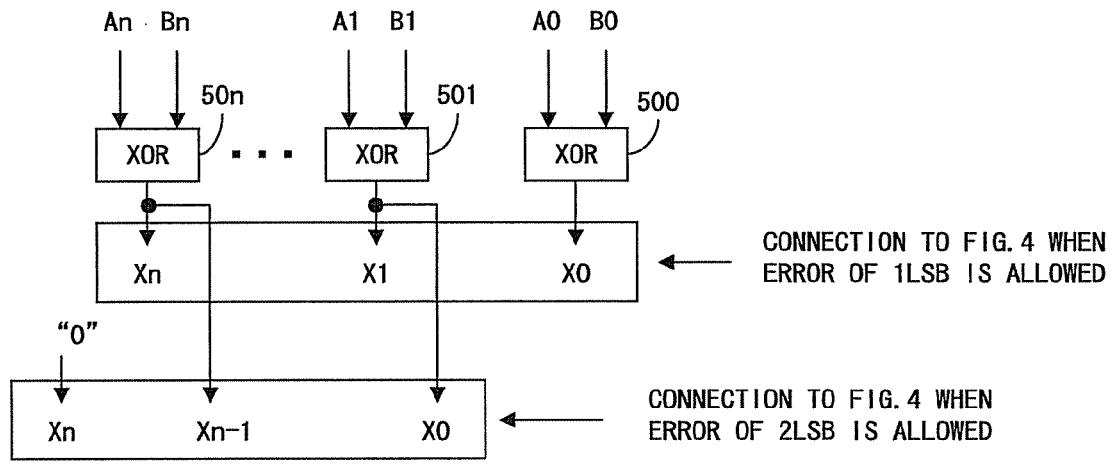
F I G. 5

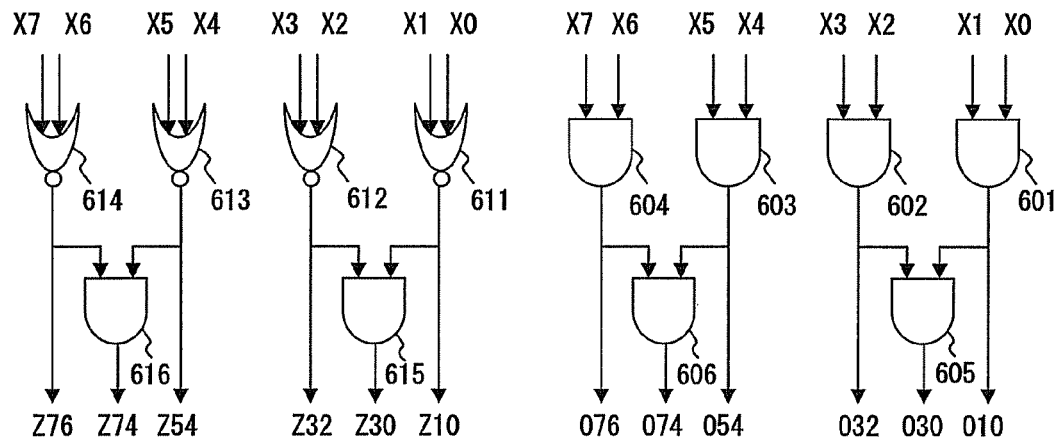
F I G. 6 A
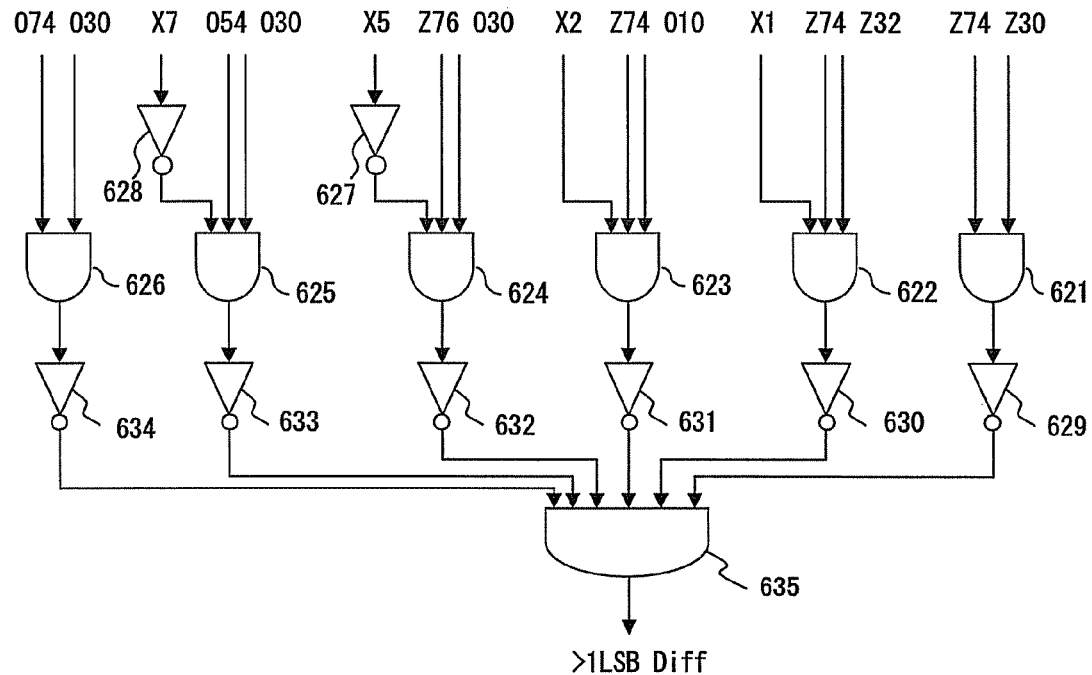
F I G. 6 B

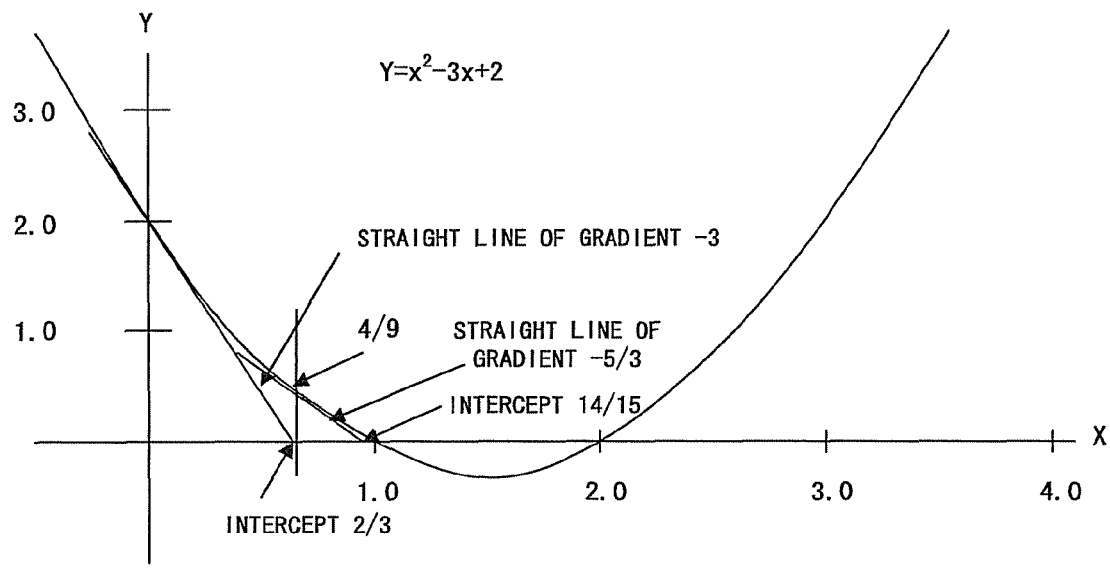
F I G. 9

ARITHMETIC CIRCUIT, ARITHMETIC METHOD, AND INFORMATION PROCESSING DEVICE

CROSS REFERENCE TO RELATED APPLICATIONS

This application is based on and hereby claims priority to Japanese Application No. 2006-346997 filed on Dec. 25, 2006, the contents of which are hereby incorporated by reference.

BACKGROUND OF THE INVENTION

1. Field of the Invention

The present invention relates to an arithmetic circuit, an arithmetic method, and an information processing device, which can correct an error that occurs at the time of a floating point arithmetic.

2. Description of the Related Art

For finer-line processes with the advance of a semiconductor manufacturing process, by way of example, also reductions in a wire width used for a semiconductor are in progress. As a result, the higher-level integration of a semiconductor proceeds, but at the same time, the probability of misoperation of a circuit increases.

Especially, in a supercomputer that performs a large-scale scientific technical calculation, many floating point arithmetic units are used, and a risk such that a misoperation occurs in one of the floating point arithmetic units due to the collision of radiation particles, which is caused by an alpha ray or a cosmic ray, and a calculation result becomes incorrect increases.

For example, if the failure rate of one floating point arithmetic unit is assumed to be 10 FIT (Failure In Time: rate at which one failure occurs per one hundred million hours), an error occurs in any of the floating point arithmetic units with a frequency of once per one hundred hours in a super computer that uses one million floating point arithmetic units.

As a method for detecting an error of a floating point arithmetic unit, a method for causing two identical arithmetic units to run in parallel, and for making a comparison between results of both of the arithmetic units exists. However, since this method requires arithmetic units and comparison circuits the numbers of which are twice as many as usual, a circuit amount significantly increases, and a burden on a supercomputer, which requires many floating point arithmetic units, becomes heavy.

Additionally, also an error of a principal portion of a floating point arithmetic unit can be detected also with a method such as parity prediction in an adder, and Modulo 3 residue check in a multiplier, and the like. However, with the parity check, an error cannot be detected when the number of error bit is even. Furthermore, with the Modulo 3 residue check, an error of the same residue cannot be detected. Still further, a circuit amount of 20 percent or more of an arithmetic unit itself must be added to detect an error in order to make these checks.

Japanese Published Patent Application No. H6-083591 discloses a floating point arithmetic unit that facilitates the detection of a failure of a gate positioned in a low order of a binary multiplier by selectively making and observing the output of a round off/digit aligner, and the output of low-order m bits.

As described above, an arithmetic circuit and a computer system, which detect an error that is problematic in a floating point arithmetic, with high probability and with a circuit amount as least as possible is desired, and besides, an arithmetic circuit and a computer system, which can correct an intermittent error caused by the collision of radiation particles, etc. by reexecuting an arithmetic instruction upon detection of an error, are desired.

SUMMARY OF THE INVENTION

The present invention was developed in light of the above described problems, and an object thereof is to efficiently detect an error, which has a large numerical error, with a less circuit amount.

To achieve the above described object, a floating point arithmetic circuit according to the present invention comprises a first arithmetic unit, to which an operand represented in a floating point format is input, for outputting a first arithmetic result having a first data width in a mantissa of the floating point format, a second arithmetic unit, to which the operand is input, for outputting a second arithmetic result having a second data width, which is smaller than the first data width, in a mantissa of the floating point format, and a comparison circuit for making a comparison between the mantissas of the first and the second arithmetic results by the second data width from each predetermined bit.

According to the present invention, the comparison circuit makes a comparison between the mantissas of the first and the second arithmetic results by the second data width from each predetermined bit, whereby whether or not the first arithmetic result is correct can be determined according to the result of the comparison.

Additionally, the second arithmetic unit is an arithmetic unit for outputting the second arithmetic result having the second data width, which is smaller than the first data width, in the mantissa of the floating point format, whereby whether or not the first arithmetic result is correct can be determined with a less circuit amount.

Furthermore, since the second arithmetic result has the second data width that is smaller than the first data width, whereby an error can be securely detected from the result of the comparison if the error that is larger than a predetermined value exists in the first and the second arithmetic results.

As described above, according to the present invention, an error that has a large numerical error can be efficiently detected with less circuit amount.

BRIEF DESCRIPTION OF THE DRAWINGS

FIG. 1 is a schematic explaining the outline of a floating point arithmetic circuit according to a preferred embodiment of the present invention;

FIG. 2 is a schematic exemplifying a specific configuration of a first arithmetic unit according to a first preferred embodiment of the present invention;

FIG. 4A is a schematic explaining a comparison that allows an error of 1LSB, and is made by a near match detector according to the first preferred embodiment of the present invention;

FIG. 4B is a schematic explaining a comparison that allows an error of 1LSB, and is made by a near match detector according to the first preferred embodiment of the present invention;

FIG. 5 is a schematic exemplifying a configuration of an input unit of the comparison circuit according to the first preferred embodiment of the present invention;

FIG. 6A is a schematic exemplifying a configuration of the input unit of the comparison circuit according to the first preferred embodiment of the present invention;

FIG. 6B is a schematic exemplifying a configuration of the input unit of the comparison circuit according to the first preferred embodiment of the present invention;

FIG. 9 is a schematic explaining an example in a case where the preferred embodiment is applied to a iterative convergent calculation.

DESCRIPTION OF THE PREFERRED EMBODIMENTS

Figure 3:
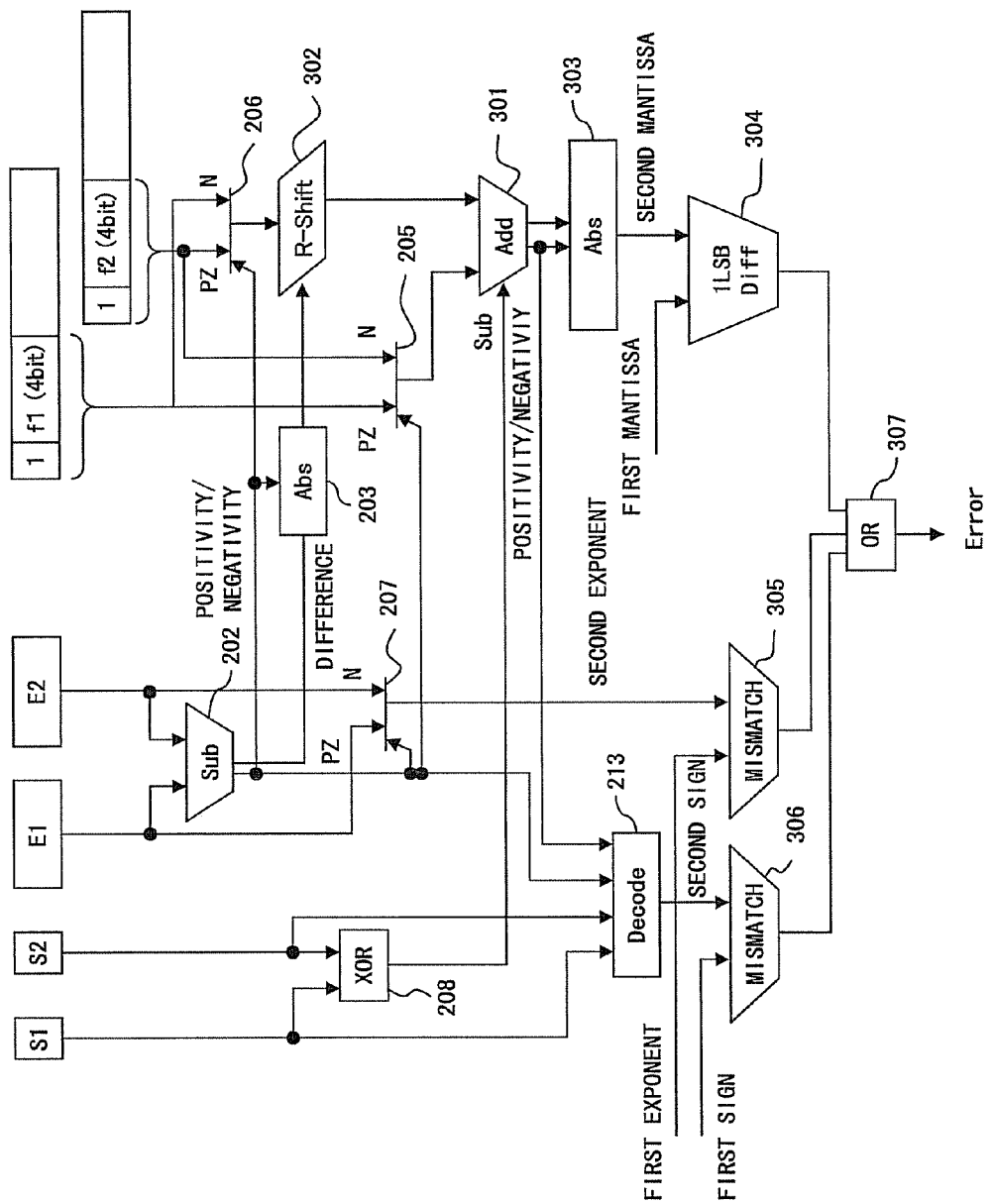
FIG. 3 is a schematic exemplifying a specific configuration of a second arithmetic unit and a comparison circuit according to the first preferred embodiment of the present invention.

Preferred embodiments according to the present invention are hereinafter described with reference to FIGS. 1 to 10.

FIG. 1 is a schematic explaining the outline of a floating point arithmetic circuit 100 according to a preferred embodiment of the present invention.

The floating point arithmetic circuit 100 shown in FIG. 1 comprises a first arithmetic unit 101 for outputting a first arithmetic result, a second arithmetic unit 102 for outputting a second arithmetic result, and a comparison circuit 103 for making a comparison between the first and the second arithmetic results by a predetermined bit width.

The first arithmetic unit 101 outputs the first arithmetic result when an operand, which is represented in a floating point format, is input. The first arithmetic result is data in the floating point format, and its mantissa has a first data width (such as a 52-bit width). Hereinafter, a sign, an exponent, and a mantissa, which configure the first arithmetic result, are hereinafter referred to as a first sign, a first exponent, and a first mantissa respectively. However, assume that a round off process is not executed for the first sign, exponent, and mantissa.

To the second arithmetic unit 102, the same operand as that of the first arithmetic unit 101 is input. Then, the second arithmetic unit 102 outputs the second arithmetic result. Also the second arithmetic result is data in the floating point format, and its mantissa has a second data width. Here, assume that the second data width is a data width (such as a 4-bit width) which is smaller than the first data width. Accordingly, the circuit amount of the second arithmetic unit 102 is smaller than that of the first arithmetic unit 101.

The sign, the exponent, and the mantissa, which configure the second arithmetic result, are hereinafter referred to as a second sign, a second exponent, and a second mantissa respectively.

The comparison circuit 103 makes a comparison between the first and the second arithmetic results by the second data width, and outputs a comparison result.

A double-precision floating point arithmetic circuit is described below as a specific example of the floating point arithmetic circuit 100 according to the preferred embodiment of the present invention. However, the present invention is not limited to a double-precision floating point arithmetic circuit.

As a matter of course, the present invention is also applicable, for example, to a single-precision floating point arithmetic circuit, etc.

The following description assumes that input data to the floating point arithmetic circuit 100 according to this preferred embodiment is data in a double-precision floating point format based on IEEE (Institute of Electrical and Electronic Engineers) 754. Also assume that the first operand composed of a sign S1 (1-bit width), an exponent E1 (11-bit width), and a mantissa F1 (52-bit width), and the second operand composed of a sign S2 (1-bit width), an exponent E2 (11-bit width), and a mantissa F2 (52-bit width) are used as input data.

Accordingly, also the output of the floating point arithmetic circuit 100 (namely, the first arithmetic unit 101) according to this preferred embodiment is data in the double-precision floating point format based on IEEE 754, and assumed to be output data composed of a sign SIGN (1 bit), an exponent EXP (11-bit width), and a mantissa FRAC (52-bit width).

First Preferred Embodiment

FIG. 2 is a schematic exemplifying a specific configuration of the first arithmetic unit 101 according to the first preferred embodiment of the present invention.

The first arithmetic unit 101 shown in FIG. 2 is a double-precision floating point adder that comprises an adder 201 for obtaining the sum of the mantissas F1 and F2, a subtractor 202 for obtaining a difference between the exponents E1 and E2, a converter 203 for converting the difference between the exponents E1 and E2 into an absolute value, a right-shifter 204 for shifting the mantissa according to the absolute value, switchers 205 to 207 for switching the output according to the positivity/negativity of the difference between the exponents E1 and E2, an exclusive OR unit 208 for obtaining the exclusive OR of the signs S1 and S2, a converter 209 for converting the output value of the adder 201 into an absolute value, a bit position detector 210 for detecting the position of a bit initially having a value 1 viewed from the most significant bit, a bit position aligner 211 for making a left-shift so that the detected bit position becomes the most significant, a round off processor 212 for executing a round off process, a decoder 213 for determining a sign SIGN from the signs S1 and S2, and the signs of the output values of the adder 201 and the subtractor 202, and a subtractor 214 for obtaining a difference between the exponent E1 or E2 and the bit position detector 210 and the bit position aligner 211.

For an addition process, the digits of the exponents E1 and E2 must be aligned. Accordingly, the subtractor 202 obtains a difference between the exponents E1 and E2. Then, the right-shifter 203 right-shifts the mantissa F2 according to the resultant difference.

Here, if the difference between the exponents E1 and E2 becomes a negative value, the mantissa F1 must be right-shifted. Therefore, an input (the mantissa F1 or F2) to the right-shifter 203 and the adder 201 is switched by switching the outputs of the switchers 205 and 206 according to the positivity/negativity of the result of the subtractor 202.

The adder 201 is an adder for adding data of a 53-bit width after restoring the most significant bit "1" in the mantissas (52 bits) of the two operands, and for outputting data of a 54-bit width. The adder 201 makes an addition or a subtraction according to the output value of the exclusive OR unit 208. The adder 201 makes an addition if the signs S1 and S2 are the same, or makes a subtraction if they differ.

The mantissas F1 and F2 are positive values in all cases. Therefore, the converter 209 takes the absolute value of the output value of the adder 201 to make the output value positive. The bit position detector 210 detects the position of a bit which initially has a value "1" viewed from the most significant bit of the addition result that becomes positive, and outputs the detected position to the bit position aligner 211.

The bit position aligner 211 left-shifts the addition result input from the converter 209 to shift the bit position detected by the bit position detector 210 to the position of the most significant bit. The bit position detected by the bit position detector 210 is input also to the subtractor 214 in order to reflect the amount of this left-shift on the exponent EXP.

The round off processor 212 executes the round off process for the value output from the bit position aligner 211. Because this round off process is a round off process based on IEEE 754, its details are omitted.

The subtractor 214 aligns the digits by subtracting the output value of the bit position detector 210 and the amount of shift made by the round off processor 212 from the exponent (E1 or E2).

The decoder 213 calculates a sign SIGN from the signs (S1, S2), the sign of the output value of the subtractor 202, and the sign of the output value of the adder 201.

With the above described process, an addition result (sign SIGN, exponent EXP, mantissa FRAC) of the first operand and the second operand is obtained. Additionally, in this preferred embodiment, the output values of the decoder 213, the switcher 207, and the converter 209 are used respectively as the first sign, the first exponent, and the first mantissa.

FIG. 3 is a schematic exemplifying a specific configuration of the second arithmetic unit 102 and the comparison circuit 103 according to the first preferred embodiment of the present invention.

To the second arithmetic unit 102, the first and the second operands are input similar to the first arithmetic unit 101. However, only high-order 4 bits are used for the mantissa. In the explanation about FIG. 3, the first operand composed of the sign S1 (1-bit width), the exponent E1 (11-bit width), and the mantissa f1 (4-bit width), and the second operand composed of the sign S2 (1-bit width), the exponent E2 (11-bit width), and the mantissa f2 (4-bit width) are used as input data.

The second arithmetic unit 102 shown in FIG. 3 is a low-precision floating point adder comprising an adder 301 for obtaining the sum of the mantissas f1 and f2, a subtractor 202 for obtaining a difference between the exponents E1 and E2, a converter 203 for converting the difference between the exponents E1 and E2 into an absolute value, a right-shifter 302 for right-shifting the mantissa according to the absolute value, switchers 205 to 207 for switching the output according to the positivity/negativity of the difference between the exponents E1 and E2, an exclusive OR unit 208 for obtaining the exclusive OR of the signs S1 and S2, and a converter 303 for converting the output value of the adder 201 into an absolute value.

Similar to the first arithmetic unit 101, the right-shifter 302 right-shifts the mantissa f2 according to the difference between the exponents E1 and E2, which is calculated by the subtractor 202. Additionally, the right-shifter 302 switches an input (the mantissa f1 or f2) to the adder 301 and the right-shifter 302 by switching the outputs of the switchers 205 and 206 according to the positivity/negativity of the output value of the subtractor 202.

The adder 301 is, for example, an adder for outputting data of a 5-bit width. The adder 301 makes an addition or a subtraction according to the signal of the exclusive OR unit 208 similar to the first arithmetic unit. The converter 303 takes the absolute value of the output value of the adder 301 to make the output value positive.

The decoder 213 calculates the second sign from the signs S1 and S2, and the signs of the output values of the subtractor 202 and the adder 201.

With the above described process, the addition of the first and the second operands is made to calculate the second arithmetic result. In this preferred embodiment, the output values of the decoder 213, the switcher 207, and the converter 303 are used respectively as the second sign, the second exponent, and the second mantissa.

The comparison circuit 103 shown in FIG. 3 comprises a near match detector 304 for determining whether or not an error is within a predetermined range by making a comparison between the first and the second mantissas, a mismatch detector 305 for detecting a mismatch by making a comparison between the first and the second exponents, a mismatch detector 306 for detecting a mismatch by making a comparison between the first and the second signs, a logical OR unit 307 for detecting an error by obtaining the logical OR of the output values of the near match detector 304, and the mismatch detectors 305 and 306.

The first and the second mantissas are input to the near match detector 304. Here, the mantissa in the second arithmetic result inevitably includes an error of 1 least significant bit (1LSB: Least Significant Bit). Therefore, only 1LSB may sometimes differ even if the calculation is made with proper precision. An error at this time is hereinafter referred to as an "error of 1LSB".

For this reason, not a perfect match detection circuit but the near match detector 304 for making a comparison that allows the error margin of 1 LSB is used in the comparison circuit 103 according to this preferred embodiment. If the error margin is made large, for example, if an error margin of 2 least significant bits is allowed, also a comparison that allows the error margin of 2LSB can be made by making a comparison between high-order bits excluding the LSB, which are obtained by subtracting 1 bit from the input data of the near match detector 304. Its details will be described later with reference to FIG. 5.

The first and the second mantissas are input to the near match detector 304. The near match detector 304 determines whether or not the error of both of the mantissas is within a predetermined range. For example, the mantissas are determined to match if the error is within the predetermined range (the range of the error of 1LSB), or the mantissas are determined to mismatch if the error is not within the predetermined range (the range of the error of 1LSB). A specific configuration example will be described with reference to FIGS. 6A and 6B.

The first and the second exponents are input to the mismatch detector 305. The mismatch detector 305 determines whether the exponents either match or mismatch by calculating a bitwise exclusive OR, and by performing a logical OR operation for the outputs. Similarly, the first and the second signs are input to the mismatch detector 306. Then, the mismatch detector 306 determines whether the signs either match or mismatch by performing an exclusive OR operation.

The outputs of the near match detector 304, and the mismatch detectors 305 and 306 are input to the logical OR unit 307. For example, if the near match detector 304, and the mismatch detectors 305 and 306 respectively output 1 upon detection of a mismatch, the logical OR unit 307 outputs 1 when at least one or more of the near match detector 304, and the mismatch detectors 305 and 306 detect a mismatch. As a result, a mismatch between the first and the second arithmetic results, namely, a numerically significant error of the first arithmetic unit 101 can be detected.

FIGS. 4A and 4B are a schematic explaining the comparison that allows the error of 1LSB, which is made by the near match detector 304 according to the first preferred embodiment of the present invention.

FIG. 4A shows a case where A and B, which are input to the near match detector 304, are identical other than LSB. This is, for example, a case where A and B are "11110" and "11111" respectively. If the exclusive OR of A and B is calculated, its arithmetic result C becomes a sequence of "0" other than the LSB, and only the LSB becomes "1".

FIG. 4B shows a case where A and B, which are input to the near match detector 304, are different by 1LSB. This is, for example, a case where the numeric values of A and B are different only 1 LSB such as a case where A and B are "10000" and "01111" respectively. If the exclusive OR of A and B is calculated, its arithmetic result C becomes "0" in a bit position where A and B match (a sequence of "0"), and becomes "1" in a bit position where A and B do not match (a sequence of "1").

It is proved from the cases shown in FIGS. 4A and 4B that the arithmetic result C obtained by calculating the exclusive OR becomes a bit pattern where "0" is consecutive sequentially from the most significant bit, and "1" is consecutive after "1" once "1" appears. Namely, if A and B are the above described bit patterns, it can be determined that A and B are different by 1LSB or less.

If the arithmetic result C is a bit pattern where all of bits are "1", this is a case where an error of A and B is the error of 1LSB. Or, if the arithmetic result C is a bit pattern where all of bits are "0", A and B perfectly match. Therefore, this is regarded as a case where A and B are different by 1LSB or less.

A specific configuration example of the comparison circuit 103 is described below with reference to FIGS. 5 and 6B.

FIG. 5 is a schematic exemplifying a configuration of an input unit of the comparison circuit 103 according to the first preferred embodiment of the present invention. A0 to An represent the bits of the first mantissa when a bit width is n, whereas B0 to Bn represent the bits of the second mantissa when a bit width is n. In the case of this preferred embodiment, it is sufficient to set n to 4.

The input unit of the comparison circuit 103 comprises exclusive OR circuits 500 to 50n, which calculate the exclusive OR of each of A0 to An and each of B0 to Bn, and output arithmetic results X0 to Xn. Assume that the arithmetic results of the exclusive OR of A0 and B0, A1 and B1, ..., An and Bn are respectively X0, X1, ..., Xn if the comparison circuit 103 is implemented as a comparison circuit that allows the error of 1LSB, or assume that the arithmetic results of the exclusive OR of the A1 and B1, A2 and B2, ..., An and Bn are respectively X0, X1, ..., Xn−1, and "0" is Xn if the comparison circuit 103 is implemented as a comparison circuit that allows the error of 2LSB, as shown in FIG. 5.

FIGS. 6A and 6B is a schematic exemplifying a configuration of a determining unit of the comparison circuit 103 according to the first preferred embodiment of the present invention. For simplicity of explanation, a comparison circuit of an 8-bit precision (n=7) is described. However, the comparison circuit is not limited to this configuration as a matter of course.

The arithmetic results X0 and X1, X2 and X3, X4 and X5, and X6 and X7 are respectively input to logical AND units 601 to 604, and logical OR units 611 to 614.

Outputs O10 and O32 of the logical AND units 601 and 602 are input to a logical AND unit 605, which then makes an output O30. similarly, outputs O54 and O76 of the logical AND units 603 and 604 are input to a logical AND unit 606, which then makes an output O74.

Accordingly, an output Onm indicates that the m-th bit to the n-th bit are "1".

Additionally, outputs Z10 and Z32 of the logical OR units 611 and 612 are input to a logical AND unit 615, which then makes an output Z30. Similarly, outputs Z54 and Z76 of the logical OR units 613 and 614 are input to a logical AND unit 616, which then makes an output Z74.

Accordingly, an output Znm indicates that the m-th bit to the n-th bit are "0". With the above described process, the sequence of "0" and that of "1" in X0 to X7 are obtained.

Furthermore, the outputs Z30 and Z74 are input to a logical AND unit 621, Z32, Z74 and X1 are input to a logical AND unit 622, O10, Z74 and X2 are input to a logical AND unit 623, O30, Z76 and the inversion of X5 are input to a logical AND unit 624, O30, O54 and the inversion of X7 are input to a logical AND unit 625, and O30 and O74 are input to a logical AND unit 626. The outputs of the logical AND units 621 to 626 are input to a logical AND unit 635 via inverters 629 to 634.

In the above described configuration, for example, if (1) O30=O74=1, it can be determined that all of X0 to X7 are 1. Or, if (2) X7=0, and O54=O30=1, (3) Z76=X5=0, and O30=1, (4) Z74=0, and X2=O10=1, or (5) Z74=Z32=0, and X1=1, it can be determined that 0 is consecutive from the most significant bit to a predetermined bit and then 1 is consecutive in X0 to X7. Additionally, if (6) Z74=Z30=0, it can be determined that all of X1 to X7 are 0 (A and B perfectly match).

In the above described cases (1) to (6), the logical AND unit 635 outputs "1". Namely, the logical AND unit 635 outputs "1" if the error of A and B is larger than 1 LSB.

As a result, whether or not an error of the first and the second mantissas, which are input to the comparison circuit 103, is a near match of the range of 1LSB can be determined from the output (0 or 1) of the comparison circuit 103.

Second Preferred Embodiment

Figure 7:
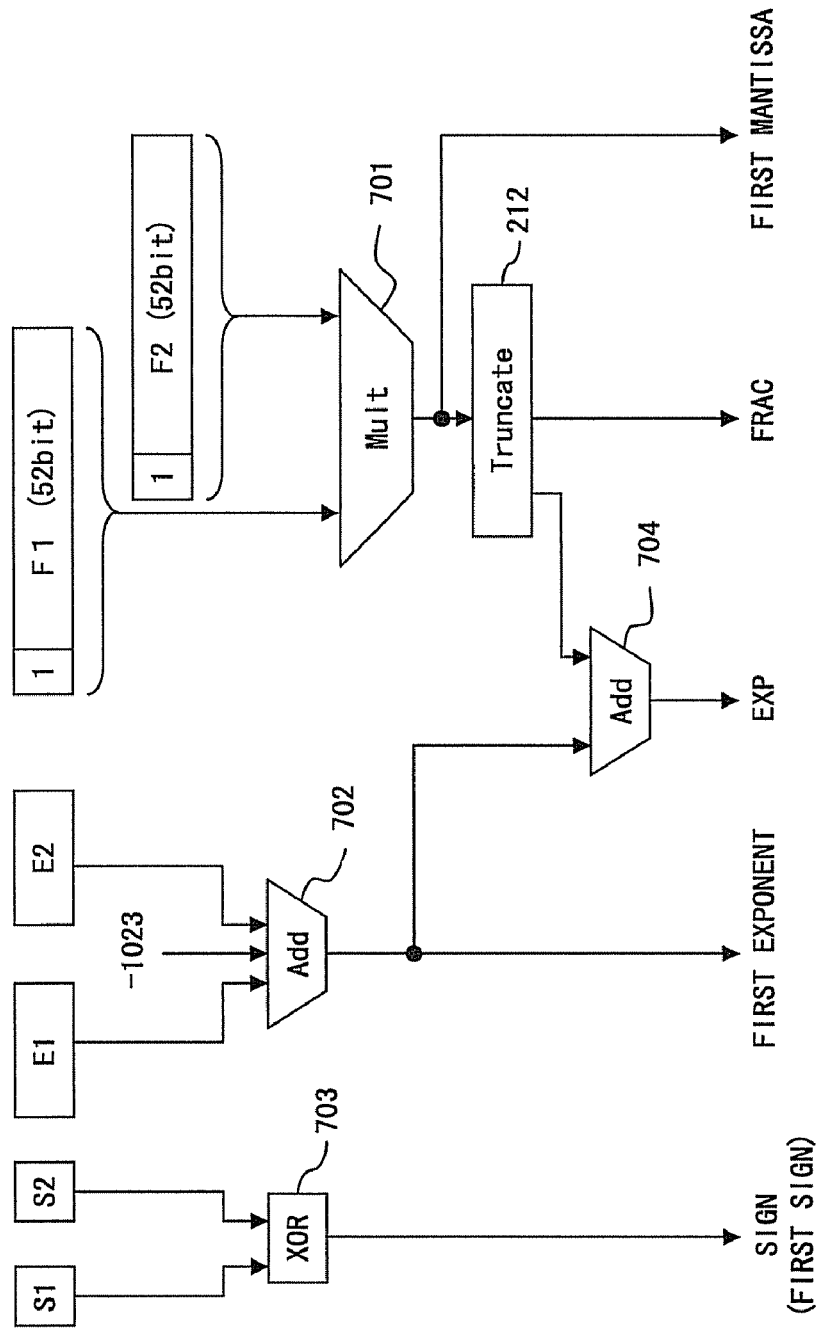
FIG. 7 is a schematic exemplifying a specific configuration of a first arithmetic unit according to a second preferred embodiment of the present invention.

FIG. 7 is a schematic exemplifying a specific configuration of the first arithmetic unit 101 according to the second preferred embodiment of the present invention.

The first arithmetic unit 101 shown in FIG. 7 is a double-precision floating point multiplier comprising a multiplier 701 for obtaining the product of the mantissas F1 and F2, a round off processor 212 for executing a round off process, an adder 702 for calculating an exponent from the sum of exponents E1 and E2, and an exclusive OR unit 703 for calculating a sign from the exclusive OR of the sings S1 and S2.

The multiplier 701 restores the most significant bit "1" in the mantissas (52 bits) of the two operands, and multiplies data of a 53-bit width. Additionally, the adder 702 adds the exponents of the two operands. The exclusive OR unit 703 obtains the exclusive OR of the signs of the two operands.

The round off process conforming to IEEE standards is executed by the round off processor 212 for the result of the multiplication made by the multiplier 701. If a digit carry occurs as a result, the adder 704 makes a correction.

With the above described process, a multiplication result (the sign SIGN, the exponent EXP, and the mantissa FRAC) of the first and the second operands is obtained. In this preferred embodiment, the output values of the exclusive OR unit 703, the adder 702, and the multiplier 701 are used respectively as the first sign, the first exponent, and the first mantissa.

Figure 8:
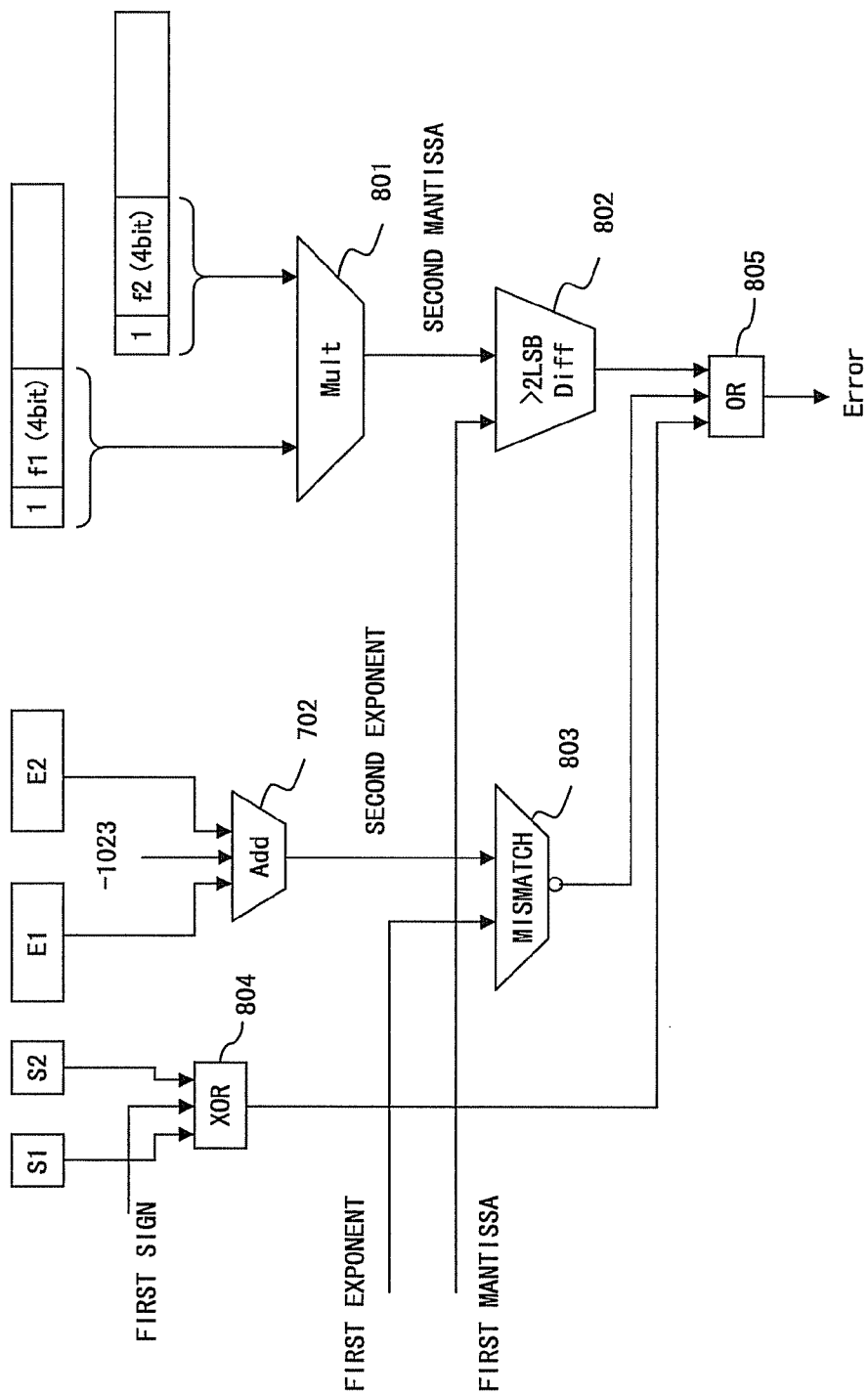
FIG. 8 is a schematic exemplifying a specific configuration of a second arithmetic unit and a comparison circuit according to the second preferred embodiment of the present invention.

FIG. 8 is a schematic exemplifying a specific configuration of the second arithmetic unit 102 and the comparison circuit 103 according to the second preferred embodiment of the present invention.

In a similar manner as in the first preferred embodiment, the first and the second operands are input to the second arithmetic unit 102. However, only high-order 4 bits are used for the mantissa. Explanation about FIG. 8 assumes that the first operand composed of a sign S1 (1-bit width), an exponent E1 (11-bit width), and a mantissa f1 (4-bit width), and the second operand composed of a sign S2 (1-bit width), an exponent E2 (11-bit width), and a mantissa f2 (4-bit width) are used as input data.

The second arithmetic unit 102 shown in FIG. 8 is a low-precision floating point multiplier comprising a multiplier 801 for obtaining the product of the mantissas f1 and f2, an adder 702 for calculating the second exponent from the sum of the exponents E1 and E2, and an exclusive OR unit 804 for calculating the first sign from the exclusive OR of the signs S1 and S2.

The multiplier 801 is, for example, a multiplier for making a multiplication of 4+1 (the bit width of the second mantissa+1) bits. The multiplier 801 restores the most significant bit "1" in the mantissas (4 bits) of the two operands, and multiplies data of a 5-bit width.

The adder 702 adds the exponents of the two operands and (−1023). The exclusive OR unit 804 obtains the exclusive OR of the signs of the two operands and the first sign.

With the above described process, the multiplication of the first and the second operands is made to calculate the second arithmetic result. In this preferred embodiment, the output values of the exclusive OR unit 804, the adder 702, and the multiplier 801 are used respectively as the second sign, the second exponent, and the second mantissa.

The comparison circuit 103 shown in FIG. 8 comprises a near match detector 802 for determining whether or not an error is within a predetermined range (the range of the error of 2LSB) by making a comparison between the first and the second mantissas, a mismatch detector 803 for detecting a mismatch by making a comparison between the first and the second exponents, a mismatch detector 804 for detecting a mismatch by making a comparison between the first and the second signs, and a logical OR unit 805 for detecting an error by obtaining the logical OR of the output results of the near match detector 802, and the mismatch detectors 803 and 804. Although the exclusive OR unit 804 used in the second arithmetic unit 102 is shared as the mismatch detector 804 used in the comparison circuit 103, they may be configured separately.

The first and the second mantissas are input to the near match detector 802. The near match detector 802 determines whether or not an error of the first and the second mantissas is within a predetermined range (the range of the error of 2LSB).

Here, the following equation is calculated as a multiplication made, for example, in a case where errors ($\Delta a, \Delta b$) are included respectively in the first operand a and the second operand b.

$$a*(1-\Delta a)*b*(1-\Delta b) = a*b*(1-\Delta a - \Delta b + \Delta a * \Delta b)$$

Here, assuming that the first and the second mantissas are 4 bits, $\Delta a$ and $\Delta b$ become a value smaller than $1/32$. However, the error ($\Delta a + \Delta b - \Delta a * \Delta b$) of the multiplication result does not become a value smaller than $1/32$ like the error of the addition result although it becomes a value smaller than $1/16$. Accordingly, a near match detector for making a comparison that allows the error of 2LSB is used as the near match detector 802 according to this preferred embodiment. Since the specific configuration example was described with reference to FIGS. 5 and 6, it is omitted here.

The first and the second exponents are input to the mismatch detector 803. The mismatch detector 803 determines whether both of the exponents either match or mismatch by calculating a bitwise exclusive OR, and by performing a logical OR operation for the results of the exclusive OR. The first sign, and the signs S1 and S2 of the first and the second operands are input to the exclusive OR unit 804, which then obtains the exclusive OR of the signs.

The logical OR unit 805 calculates the logical OR of the near match detector 802, and the mismatch detectors 803 and 804. Accordingly, for example, if the near match detector 802 and the mismatch detectors 803 and 804 respectively output 1 upon detection of a mismatch, the logical OR unit 805 outputs 1 when at least one or more of the nearly match detector 802, and the mismatch detectors 803 and 804 detect a mismatch. As a result, a mismatch between the first and the second arithmetic results, namely, a numerically significant error of the first arithmetic unit 101 can be detected.

For the first and the second arithmetic units, two sets of sign and exponent calculation circuits of the same scale are required. The circuit amount of the mantissa of the second arithmetic unit is significantly reduced as will be described next.

Normally, the circuit amount of an adder or a shifter is approximately proportional as follows if a bit width is assumed to be N.

$$N \cdot \log_2 N$$

Accordingly, for example, a circuit amount required for the adder 301 or the right-shifter 302 of 5 bits is approximately $1/20$ in comparison with the adder 201 or the right-shifter 204 of 52 bits.

Therefore, in the first preferred embodiment, the second arithmetic unit 102 and the comparison circuit 103 can be implemented with a circuit amount of 10 percent or less of the entire floating point arithmetic circuit 100 if the mantissa is 52 bits.

Additionally, the circuit amount of the multiplier is approximately proportional to the square of N. Accordingly, the multiplier 801 of 5 bits can be implemented, for example, with a circuit amount of approximately $1/100$ in comparison with the multiplier 701 of 53 bits.

Therefore, in the second preferred embodiment, the second arithmetic unit 102 and the comparison circuit 103 can be implemented with a circuit amount of 2 to 3 percent of the entire floating point arithmetic circuit 100.

Note that the mantissa is equal to or larger than 1.0 and smaller than 2.0 if omitted 1.0 is complemented. A comparison is made only for the first and the second signs, and the first and the second exponents by regarding the value of the mantissa as 1.0, whereby required hardware can be further reduced since, for example, the adder 301 and the multiplier 801 become unnecessary although a precision for detecting an error deteriorates.

FIG. 9 is a schematic explaining an example when the preferred embodiment is applied to a iterative convergent calculation.

The graph represented in FIG. 9 is a graph of a second degree equation $Y = X*X - 3*X + 2$. A case where a solution to this second degree equation is obtained with Newton Lapson method, which is an iterative convergent calculation, is described below.

For the second degree equation $Y(X)=X*X-3*X+2$, $Y=0$ if $X=1$ and $X=2$. Obtainment of the solution $X=1$ is considered starting from $X=0$.

Since $dY/dX=2*X-3$, the gradient of Y when $X=0$ is $Y'(0)=-3$, and $Y(0)=2$. If the next value of X is obtained from $X=X-Y(0)/Y'(0)$, $X=2/3$. Similarly, the gradient when $X=2/3$ is $Y'(2/3)=-5/3$, and $Y(2/3)=4/9$. Since the next value of $X=14/15$, $Y'(14/15)=-17/15$, and $Y(14/15)=16/225$ in a similar manner. The further next value of X is $X=254/255$. At this time, an error from the correct solution $X=1$ is reduced to approximately 0.4 percent.

As is evident from the above calculation, even if an error occurs in the next X due to an occurrence of an error in the calculation of a correction amount of Y, Y' or X, X converges to 1.0 with iterations as far as X remains to be smaller than 1.5.

If an error occurs due to a calculation error, and goes away from the value of a solution, the number of iterations increases and an additional calculation time is required. However, since the occurrence frequency of the above described error caused by radiation particles, etc. is low, an influence exerted on the entire calculation time is on an ignorable order.

In the meantime, if an error due to a calculation error is large, and X becomes larger than 1.5, the value of X converges to 2.0 with subsequent iterations. Because this is also a solution to $X*X-3*X+2=0$, this value is correct as a solution to this second degree equation. However, in an actual iterative convergent calculation, if a calculation error at midpoint is large, X converges to an unintended point, or a convergent point cannot be found in a high degree curve and X diverges in some cases.

For example, the first principle calculation, which is used in a nano- or bio-field mainly utilized by a supercomputer, etc., is made to converge the energy of an entire system to a minimum with iterations such that the position of an atom is moved by calculating repulsive force between electrons, and by totaling the repulsive forces, and force exerted on each atom is calculated.

The force exerted on each atom is the sum of forces from electrons of all of other atoms. Even if some error such as an error caused by an intermittent error of hardware occurs in the calculation of force exerted from one electron, the electron is one of several thousands or several tens of thousands of electrons. Therefore, its influence is reduced.

As described above, with a normal calculation, the influence of an error, which is small as a value, is automatically modified during the course of a iterative convergent process in most cases as far as an error that causes a significant difference of digits does not occur in an individual calculation.

Accordingly, reexecution is made by detecting an error, which causes an incomparable large error, by using the floating point arithmetic circuit 100 according to this preferred embodiment, whereby an intermittent error caused by a failure, which is not a fixed failure such as the collision of radiation particles caused by an alpha ray or a cosmic ray, can be corrected.

Figure 10:
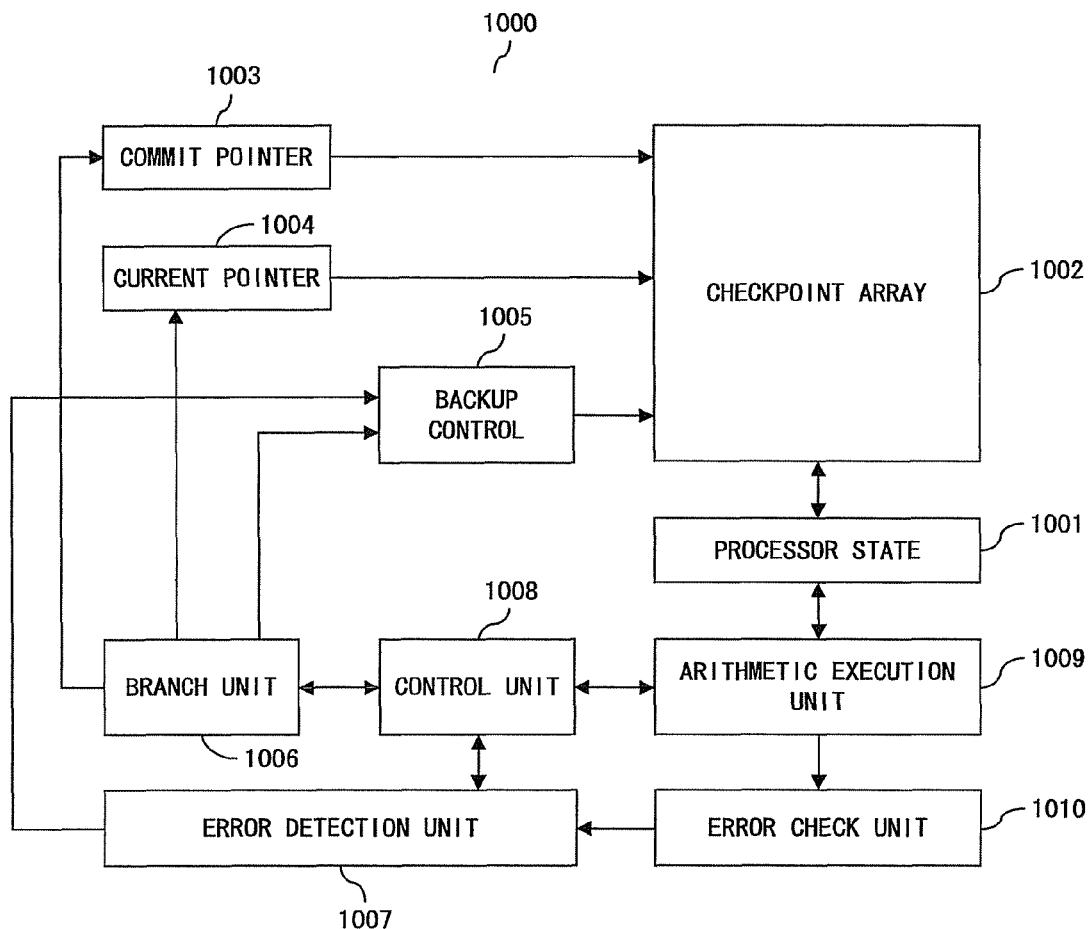
FIG. 10 is a block diagram exemplifying a configuration required for the reexecution of a floating point arithmetic circuit according to the preferred embodiment of the present invention.

FIG. 10 is a block diagram exemplifying a configuration required for the reexecution of the floating point arithmetic circuit 100 according to the preferred embodiment of the present invention. For the reexecution when a hardware error is detected, its details are described in the following documents. Therefore, its outline is described.

1. H. Ando, T. Kitamura, M. Shebanow, M. Butler, U.S. Pat. No. 6,519,730, "Computer and error recovery method for the same"

2. H. Ando, Y. Yoshida, A. Inoue, I. Sugiyama, T. Asakawa, K. Morita, T. Muta, T. Motokurumada, S. Okada, H. Yamashita, Y. Satsukawa, A. Konmoto, R. Yamashita, H. Sugiyama, "A 1.3-GHz fifth-generation SPARC64 microprocessor", Solid-State Circuits, IEEE Journal, Volume 38, Nov. 11, 2003, 1896-1905

The floating point arithmetic circuit 1000 shown in FIG. 10 comprises at least a processor state 1001 for holding a state required for the execution of a program, a checkpoint array 1002 for storing a state when the processor operation is properly performed without error in certain intervals, a commit pointer 1003 pointing to an entry that stores a state where the execution of an instruction is properly completed last, a current pointer 1004 pointing to an entry that stores an immediately preceding state, a backup control 1005 for performing a control to resume the execution from a state by extracting the state pointed to by the commit pointer from the checkpoint array 1002, and by restoring the state in the processor state 1001 when a misoperation, etc. occurs, a branch unit 1006 for handling a branch instruction, an error detection unit 1007 for monitoring a misoperation of each unit, a control unit 1008 for controlling each unit, an arithmetic execution unit 1009 configured with the first arithmetic unit 101, and an error check unit 1010 for monitoring the correctness/incorrectness of the arithmetic result of the arithmetic execution unit 1009 by being configured with the second arithmetic unit 102 and the comparison circuit 103.

If the execution is speculatively made by predicting a direction before a branch destination is determined, the state (contents of the processor state 1001) immediately preceding the execution of the branch instruction is stored in an entry of the checkpoint array 1002 pointed to by the current pointer 1004. Then, the execution of the instruction at the predicted branch destination is started. Then, the branch unit 1006 increments the current pointer 1004 by 1. Additionally, the branch unit 1006 performs a control to make the commit pointer 1003 always point to the completion state of the last execution of an instruction by monitoring the completion of the execution of the instruction, and by incrementing the commit pointer 1003 by 1 upon completion of the execution up to an entry next to the entry pointed to by the commit pointer 1003.

If a branch prediction miss is found, the error of the branch prediction is modified by extracting a checkpoint immediately preceding a conditional branch instruction from the checkpoint array 1002, and by restoring the processor state to resume the execution from the instruction immediately succeeding the checkpoint.

When the error detection unit 1007 detects an error with the processes referred to in the first and the second preferred embodiments, the error detection unit 1007 notifies the backup control 1005 of the misoperation.

Upon receipt of the misoperation notification, the backup control 1005 extracts the state in which the execution is properly completed and which is pointed to by the commit pointer 1003, and restores the extracted state in the processor state 1001. Then, the execution is resumed from this state (reexecution is made). As a result, an intermittent error caused by the collision of radiation particles, etc. can be corrected. This procedure is similar to that for correcting a branch prediction error, and can effectively use the circuit existing for a branch prediction miss handling.

As described above, the second arithmetic unit 102 and the comparison circuit 103 of a short precision (such as 4 bits) are added to the first arithmetic unit 101 in order for an error check, and a comparison that allows a predetermined error margin (such as an error of 1LSB) of the first and the second arithmetic results is made, whereby an error which causes a large numerical error can be efficiently detected. Additionally, the detected error can be corrected by using the above described reexecution mechanism.

Furthermore, since the second mantissa according to this preferred embodiment has a 4-bit width, the second arithmetic unit 102 and the comparison circuit 103 can be implemented with a circuit amount of approximately 2 to 3 percent of the entire floating point arithmetic circuit 100 in the case of the floating point multiplier, or with a circuit amount of approximately 10 percent or less of the entire floating point arithmetic circuit 100 in the case of the floating point adder. Namely, a circuit amount required to detect an error can be reduced in comparison with conventional techniques.

Still further, even for an intermittent error, which causes a significant difference of digits of the numerical value of an arithmetic result and cannot be detected with a conventional method for detecting an error of a principal portion of a floating point arithmetic unit with a parity check or a residue check, an error larger than the precision of the second mantissa can be securely detected with the method according to the present invention.

Still further, when a iterative convergent calculation is made, en error that is smaller than an allowed numerical error is corrected during the iterative convergent calculation, whereby an added circuit the amount of which is less than a conventional error detection method can be implemented, and the probability of occurrence of a problem such as a failure of convergence of the calculation, or an error occurrence in an arithmetic result despite being terminated without detecting an abnormality can be significantly reduced.

What is claimed is:

1. A floating point arithmetic circuit, comprising:
a first arithmetic unit, to which an operand represented in a floating point format is input, for outputting a first arithmetic result having a first data width in a mantissa of the floating point format;
a second arithmetic unit, to which the operand is input, for outputting a second arithmetic result having a second data width, which is smaller than the first data width, in a mantissa of the floating point format; and
a comparison circuit for making a comparison between the mantissas of the first and the second arithmetic results by the second data width from each predetermined bit.

2. The floating point arithmetic circuit according to claim 1, wherein:
said comparison circuit comprises
an exclusive OR circuit for performing a bitwise exclusive OR operation of the mantissas of the first and the second arithmetic results by the second data width from a most significant bit, and
a mantissa comparison circuit for determining whether or not an arithmetic result of the exclusive OR operation is a predetermined bit pattern, and for outputting a comparison result indicating a match if the arithmetic result is the predetermined bit pattern; and
the first and the second arithmetic results are determined to match if said mantissa comparison circuit outputs the comparison result indicating the match.

3. The floating point arithmetic circuit according to claim 2, wherein
the predetermined bit pattern is any of a bit pattern where all of bits are 1, a bit pattern where all of bits are 0, and a bit pattern where 0 is consecutive from the most significant bit to an arbitrary bit and 1 is consecutive from a bit next to the arbitrary bit to a predetermined bit.

4. The floating point arithmetic circuit according to claim 2, further comprising
a sign comparison circuit for making a comparison between signs of the first and the second arithmetic results, and for outputting a comparison result indicating a match if the signs match as a result of the comparison, wherein
the first and the second arithmetic results are determined to match if said mantissa comparison circuit and said sign comparison circuit output the comparison result indicating the match.

5. The floating point arithmetic circuit according to claim 2, further comprising
an exponent comparison circuit for making a comparison between exponents of the first and the second arithmetic results, and for outputting a comparison result indicating a match if the exponents match as a result of the comparison, wherein
the first and the second arithmetic results are determined to match if said mantissa comparison circuit and said exponent comparison circuit output the comparison result indicating the match.

6. The floating point arithmetic circuit according to claim 1, further comprising
a reexecution circuit for causing said first arithmetic unit to reexecute an arithmetic according to the result of the comparison made by said comparison circuit.

7. An arithmetic examination circuit for examining a first arithmetic result, which is connected to a first arithmetic unit, to which an operand represented in a floating point format is input, for outputting the first arithmetic result having a first data width in a mantissa of the floating point format, comprising:
a second arithmetic unit, to which the operand is input, for outputting a second arithmetic result having a second data width, which is smaller than the first data width, in a mantissa of the floating point format; and
a comparison circuit for making a comparison between the mantissas of the first and the second arithmetic results by the second data width from each predetermined bit.

8. The arithmetic examination circuit according to claim 7, wherein:
said comparison circuit comprises
an exclusive OR circuit for performing a bitwise exclusive OR operation of the mantissas of the first and the second arithmetic results by the second data width from a most significant bit, and
a mantissa comparison circuit for determining whether or not an arithmetic result of the exclusive OR operation is a predetermined bit pattern, and for outputting a comparison result indicating a match if the arithmetic result is the predetermined bit pattern; and
the first and the second arithmetic results are determined to match if said mantissa comparison circuit outputs the comparison result indicating the match.

9. The arithmetic examination circuit according to claim 8, wherein
the predetermined bit pattern is any of a bit pattern where all of bits are 1, a bit pattern where all of bits are 0, and a bit pattern where 0 is consecutive from the most significant bit to an arbitrary bit and 1 is consecutive from a bit next to the arbitrary bit to a predetermined bit.

10. The arithmetic examination circuit according to claim 8, further comprising
a sign comparison circuit for making a comparison between signs of the first and the second arithmetic results, and for outputting a comparison result indicating a match if the signs match as a result of the comparison, wherein the first and the second arithmetic results are determined to match if said mantissa comparison circuit and said sign comparison circuit output the comparison result indicating the match.

11. The arithmetic examination circuit according to claim 8, further comprising
an exponent comparison circuit for making a comparison between exponents of the first and the second arithmetic results, and for outputting a comparison result indicating a match if the exponents match as a result of the comparison, wherein
the first and the second arithmetic results are determined to match if said mantissa comparison circuit and said exponent comparison circuit output the comparison result indicating the match.

12. The arithmetic examination circuit according to claim 7, further comprising
a reexecution circuit for causing said first arithmetic unit to reexecute an arithmetic according to the result of the comparison made by said comparison circuit.

13. An information processing device, comprising:
a first arithmetic unit, to which an operand represented in a floating point format is input, for outputting a first arithmetic result having a first data width in a mantissa of the floating point format;
a second arithmetic unit, to which the operand is input, for outputting a second arithmetic result having a second data width, which is smaller than the first data width, in a mantissa of the floating point format; and
a comparison circuit for making a comparison between the mantissas of the first and the second arithmetic results by the second data width from each predetermined bit.

14. The information processing device according to claim 13, wherein:
said comparison circuit comprises
an exclusive OR circuit for performing a bitwise exclusive OR operation of the mantissas of the first and the second arithmetic results by the second data width from a most significant bit, and
a mantissa comparison circuit for determining whether or not an arithmetic result of the exclusive OR operation is a predetermined bit pattern, and for outputting a comparison result indicating a match if the arithmetic result is the predetermined bit pattern; and
the first and the second arithmetic results are determined to match if said mantissa comparison circuit outputs the comparison result indicating the match.

15. The information processing device according to claim 14, wherein
the predetermined bit pattern is any of a bit pattern where all of bits are 1, a bit pattern where all of bits are 0, and a bit pattern where 0 is consecutive from the most significant bit to an arbitrary bit and 1 is consecutive from a bit next to the arbitrary bit to a predetermined bit.

16. The information processing device according to claim 14, further comprising
a sign comparison circuit for making a comparison between signs of the first and the second arithmetic results, and for outputting a comparison result indicating a match if the signs match as a result of the comparison, wherein
the first and the second arithmetic results are determined to match if said mantissa comparison circuit and said sign comparison circuit output the comparison result indicating the match.

17. The information processing device according to claim 14, further comprising
an exponent comparison circuit for making a comparison between exponents of the first and the second arithmetic results, and for outputting a comparison result indicating a match if the exponents match as a result of the comparison, wherein
the first and the second arithmetic results are determined to match if said mantissa comparison circuit and said exponent comparison circuit output the comparison result indicating the match.

18. The information processing device according to claim 13, further comprising
a reexecution circuit for causing said first arithmetic unit to reexecute an arithmetic according to the result of the comparison made by said comparison circuit.

19. An arithmetic method for use in an arithmetic circuit for examining a first arithmetic result output by a first arithmetic unit by using a second arithmetic result output by a second arithmetic unit, comprising:
inputting an operand represented in a floating point format, and outputting the first arithmetic result having a first data width in a mantissa of the floating point format;
inputting the operand, and outputting the second arithmetic result having a second data width, which is smaller than the first data width, in a mantissa of the floating point format; and
making a comparison between the mantissas of the first and the second arithmetic results by the second data width from each predetermined bit.

20. An arithmetic examination method for use in an arithmetic examination circuit for examining a first arithmetic result, which is connected to a first arithmetic unit, to which an operand represented in a floating point format is input, for outputting the first arithmetic result having a first data width in a mantissa of the floating point format, comprising:
inputting the operand, and outputting a second arithmetic result having a second data width, which is smaller than the first data width, in a mantissa of the floating point format; and
making a comparison between the mantissas of the first and the second arithmetic results by the second data width from each predetermined bit.

* * * * *